United States Patent [19]
Matsunaga et al.

[11] Patent Number: 4,606,223
[45] Date of Patent: Aug. 19, 1986

[54] DEVICE FOR DETECTING ROTATING SPEED OF THIN SHAPE MOTOR

[75] Inventors: Hiroshi Matsunaga; Yoji Shimojima; Ichiro Tokunaga, all of Furukawa; Kosei Obata; Yukihiko Yasuhara, both of Miyagi, all of Japan

[73] Assignee: Alps Electric Co., Ltd., Japan

[21] Appl. No.: 619,033

[22] Filed: Jun. 11, 1984

[30] Foreign Application Priority Data

Sep. 6, 1983 [JP] Japan ............................. 58-87096[U]

[51] Int. Cl.⁴ .......................................... G01M 15/00
[52] U.S. Cl. ..................................................... 73/116
[58] Field of Search ................. 310/DIG. 6; 324/175; 73/116; 250/231 SE

[56] References Cited

U.S. PATENT DOCUMENTS

| | | | |
|---|---|---|---|
| 3,023,335 | 2/1962 | Burr | 310/DIG. 6 X |
| 3,570,116 | 3/1971 | Armstrong et al. | 324/175 X |
| 3,575,129 | 4/1971 | Sullivan | 324/175 X |
| 4,321,600 | 3/1982 | Blaser | 340/870.29 |
| 4,327,362 | 4/1982 | Hoss | 250/231 SE X |

FOREIGN PATENT DOCUMENTS 681515  8/1979  U.S.S.R. ...................... 310/DIG. 6

Primary Examiner—Jerry W. Myracle
Attorney, Agent, or Firm—Guy W. Shoup

[57] ABSTRACT

A device for detecting rotating speed of a thin shape motor including a vertical shaft rotatably supported on a base plate, a rotor of a planar shape secured to the vertical shaft in a spaced apart relation from the base plate, and a stator provided downwardly from the rotor on the base plate, comprises a rotatable disc of a diameter smaller than that of the rotor secured to the vertical shaft and having speed detecting indices on a peripheral surface thereof, and a luminous element and a light-receiving element provided outwardly of the rotor. A light-projecting optical fiber and a light-receiving optical fiber are further provided to extend along the base plate such that one end of the light-projecting optical fiber is located to oppose the luminous element, while one end of the light-receiving optical fiber is located to oppose the light-receiving element, and that the other ends of the two optical fibers are placed in opposition to the peripheral surface of the rotatable disc.

6 Claims, 2 Drawing Figures

DEVICE FOR DETECTING ROTATING SPEED OF THIN SHAPE MOTOR

BACKGROUND OF THE INVENTION

This invention relates to a device for detecting the rotating speed of a thin shape motor.

Heretofore a device for detecting the rotating speeed of the aforementioned type motor has been known. For instance in a construction shown in FIG. 1, a rotor 1 is provided upward of a base plate (not shown) so as to be rotated by a stator (not shown) provided on the base plate. On the lower surface of the rotor 1 is provided a code plate 2 comprising a plurality of reflecting surfaces 2a that are spaced apart from each other by a predetermined distance. Downwardly of the rotor 1, a photoreflector 3 comprising a luminous element and a light receiving element is provided betweenthe base plate and the rotor 1.

When the rotor 1 of the motor is rotated while the luminous element is energized, the light emitted from the luminous element is projected on the code plate 2 to be reflected by the reflecting surfaces 2a successively. The reflected light is received by the light receiving element in the photoreflector 3 to be converted into an electric signal. A wave-shaping circuit and the like (also not shown) shapes the electric signal into a rectangular signal to be used for detecting the rotating speed of the thin shape motor.

With the above described construction of the conventional rotating speed detecting device, however, since the light emitted from the luminous element is projected directly onto the code plate 2 without directivity, the light does not converge onto a desired position of the code plate 2. As a consequence the difference between the outputs obtained from the reflecting surfaces 2a and nonreflecting surfaces of the code plate 2 is not sufficiently large, and hence the sensitivity of the detection of the conventional device has been unsatisfactory. Furthermore, since the photoreflector 3 containing the luminous element and the light-receiving element, which are difficult to reduce in size, is provided between the base plate and the rotor 1, there has been a limitation in reducing the distance between the two members. Hence the conventional construction has not been suitable for reducing the thickness of the thin shape motor.

Although there has been proposed a construction comprising a lens or slit for improving the directivity of light, such a construction could not much contribute to the reduction of the thickness of the thin shape motor.

SUMMARY OF THE INVENTION

An object of the present invention is to provide a device for detecting the rotating speed of a thin shape motor capable of overcoming the difficulties of the conventional detecting devices.

Another object of the invention is to provide a device for detecting the rotating speed of a thin shape motor, wherein the directivity of light emitted from the luminous element is improved for improving the sensitivity in detection, while contributing to the reduction of the thickness of the thin shape motor.

According to the present invention, there is provided a device for detecting the rotating speed of a thin shape motor of a type comprising a vertical shaft rotatably mounted on a base plate, a rotor of a planar shape secured to the vertical shaft in a spaced apart relation from the base plate, and a stator provided downwardly from the rotor on the base plate, the improvement comprising a rotatable disc of a diameter smaller than that of the rotor secured to the vertical rotatable shaft, the rotatable disc having a speed detecting indices on a peripheral surface thereof, a luminous element and a light-receiving element provided outwardly of the planar rotor, and a light projecting optical fiber and a light receiving optical fiber extending along the base plate such that one end of the light projecting optical fiber is located to oppose the luminous element, while one end of the light receiving optical fiber is located to oppose the light receiving element, and that the other ends of the two optical fibers are placed in opposition to the peripheral surface of the rotatable disc.

DESCRIPTION OF THE PREFERRED EMBODIMENT

Figure 1:
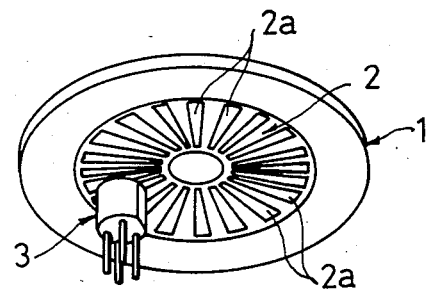
FIG. 1 is a perspective view taken from a lower position of a conventional rotating speed detecting device.
Figure 2:
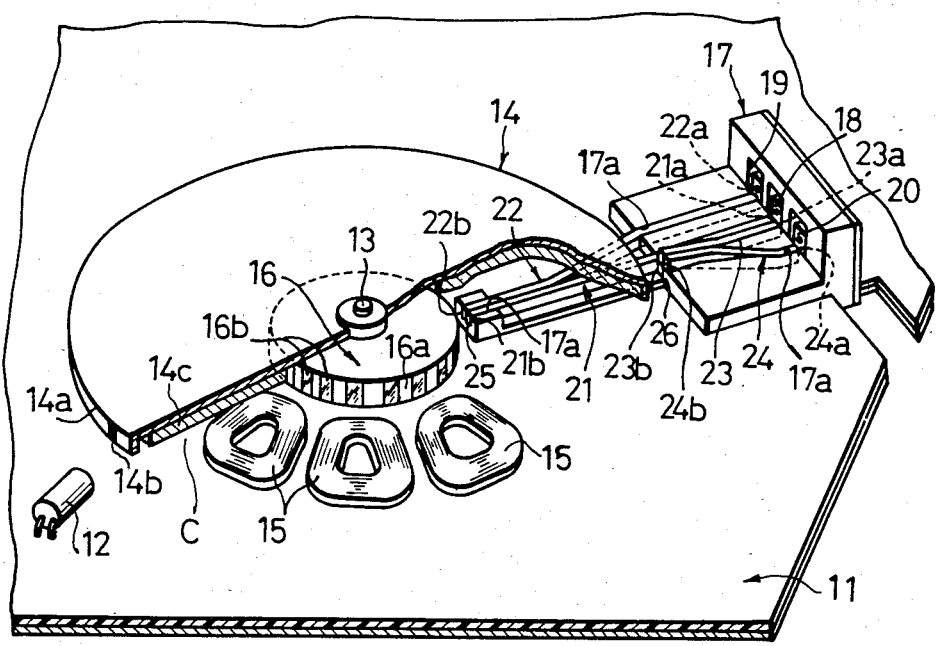
FIG. 2 is a perspective view taken from an upper position of a device for detecting rotating speed of a thin shape motor according to the present invention.

A preferred embodiment of the present invention will now be described with reference to FIG. 2.

In the embodiment shown, there is provided a base plate 11 on which various electrical parts are mounted. In the base plate 11 is also provided a vertical shaft 13 which is supported freely rotatably by means of bearings (not shown). A rotor 14 in the form of a circular disc is secured to the rotatable shaft 13 at a position spaced apart from the base plate 11 by a predetermined distance C. The peripheral portion of the rotor 14 is bend downward for providing a circumferential surface 14a. A black portion 14b not reflecting light is provided on the circumferential surface 14a to be operable as a rotating speed detecting index. An annular magnet 14c is secured to the lower surface of the rotor 14. On the base plate 11 below the rotor 14 are provided a number of field coils 15 which are arranged in a circle around the shaft 13 so as to be operable as a stator.

A rotating speed detecting device of this invention is provided on the thin shape motor of the above described construction. More specifically, a circular disc 16 of a diameter smaller than that of the rotor 14 is secured to the rotatable shaft 13 at an intermediate position between the base plate 11 and the rotor 14 so that the circular disc 16 is rotatable radially inwardly of the stator coil 15. On the circumferential surface 16a of the circular disc 16 are provided a number of reflecting portions 16b spaced apart by a predetermined distance so that the portions 16b are employable as indices for detecting the rotating speed of the thin shape motor. Radially outwardly of the rotor 14, a guide pedestal 17 is provided on the base plate 11, and a luminous element such as a luminous diode 18 and two light receiving elements such as phototransistors 19 and 20 are provided on the guide pedestal 17. Two pairs of optical fibers 21, 22 and 23, 24, each having a rectangular cross section, are supported on the guide pedestal 17 to be extended between the luminous diode 18 and the circular disc 16, between the phototransistor 19 and the circular disc 16, between the luminous diode 18 and the rotor 14, and between the other phototransitor 20 and the rorot 14, respectively. That is, ends 21a and 22a of the longer pair of the optical fibers 21 and 22 are disposed at positions facing the luminous diode 18 and the phototransistor 19, respectively, while the optical fibers 21 and 22 are supported in grooves 17a formed in the pedestal 17 and extended along the base plate 11 so that the other ends 21b and 22b are brought into the proximity of the circumferential surface 16a of the circular disc 16. The ends 21b and 22b are joined together side by side by a heat-forming process to that a smooth surface 25 is formed at the joined ends of the optical fibers 21 and 22. On the other hand, ends 23a and 24a of the shorter pair of the optical fibers 23 and 24 are disposed at positions facing the luminous diode 18 and the phototransistor 20, respectively, while the optical fibers 23 and 24 are supported in the grooves 17a of the pedestal 17 to be extended obliquely upwardly so that the other ends 23b and 24b are brought into the proximity of the circumferential surface 14a of the rotor 14. The ends 23b and 24b are joined together side by side by a heat-forming process so as to provide a smooth surface 26 at the joined ends of the optical fibers 23 and 24. Optical fibers 21 and 23 within the two pairs, which are used for projecting light, are also joined together at the ends 21a and 23a facing the luminous diode 18 by a heat-forming process, so that the optical fibers 21 and 23 commonly receive the light emitted from the luminous diode 18.

The rotating speed detecting device for the thin shape motor, which is constructed as described above, operates as follows.

Upon energization of the field coils 15, the rotor 14 is rotated together with the circular disc 16. At this time, the light emitted from the luminous diode 18 into the ends 21a and 23a of the light projecting optical fibers 21 and 23 passes through the optical fibers 21 and 23 to predetermined positions on the circumferential surfaces 16a and 14a of the circular disc 16 and the rotor 14, respectively, without being dispersed as in the conventional detecting devices and in a concentrated manner so as to improve the directivity and to assure a sufficient light quantity. By the circular disc 16 having a number of reflecting portions 16b, the light is reflected several times in an interrupted manner corresponding to the number of the reflecting portions 16b during one rotation of the circular disc 16. The light reflected by the reflecting portions 16b into the end surface 22b of the light receiving optical fiber 22 passes through the fiber 22 to the phototransistor 19 facing the other end 22a of the optical fiber 22. In the phototransistor 19, the light signal is converted into an electric signal which is further shaped by a wave-shaping circuit and the like provided subsequently into a signal having a rectangular waveform, and the rotating angle of the circular disc 16 is detected based on the rectangular wave signal.

On the other hand, the light transmitted through the short optical fiber 23 and projected on the circumferential surface 14a of the rotor 14 through the end 23b is reflected only one time during one rotation of the rotor 14 because of the existence of the nonreflecting portion 14b, and the thus obtained light signal received into the end 24b of the light receiving optical fiber 24 is passed through the optical fiber 24 to the end 24a and then to the phototransistor 20. The phototransistor 20 converts the light signal into another electric signal which is thereafter shaped by another wave-shaping circuit and the like provided in the subsequent stage into an electric signal of a rectangular wave form to be utilized for detecting the rotating speed of the rotor 14.

Since the light-projecting and light-receiving optical fibers 21, 22, 23 and 24 of high directivity are used in the rotating speed detecting device of this invention, the light from the luminous diode 18 can be projected efficiently onto the rotor 14 and the circular disc 16 without being dispersed, and received efficiently by the phototransistors 19 and 20, so that the rotating speed can be detected at a high precision. Furthermore, the ends 21b and 22b of the light-projecting and light-receiving optical fibers 21 and 22, and also the ends 23b and 24b of the light-projecting and light-receiving optical fibers 23 and 24 are joined together so as to form smooth end surfaces 25 and 26 for these ends, respectively. Thus, in the case of, for instance, optical fibers 21 and 22, by providing the joining line between the two ends 21b and 22b in parallel with the boundary line between two adjacent reflecting portions 16b of the circular disc 16, the difference between the outputs obtained for the two adjacent reflecting portions 16b on both sides of the boundary line can be made distinct and the sensitivity of the detection can be substantially improved.

According to the invention, the luminous diode 18 and the phototransistors 19 and 20, which inherently cannot be made so small, are arranged outside of the rotor 14 instead of underneath it, and the light-projecting and light-receiving optical fibers 21 and 22 of small cross-sectional areas are extended from the diode 18 and phototransistors 19 and 20 to the proximity of the circular disc 16. Since the optical fibers can be extended through a small gap, the thickness of the circular disc 16 and the distance C between the base plate 11 and the rotor 14 can be substantially reduced, thus rendering the rotating speed detecting device advantageous for reducing the thickness of the thin shape motor.

In a case where two pairs of optical fibers 21, 22, 23 and 24 are used as in the above described embodiment for providing two output signals, the light emitted from a single luminous diode 18 can be commonly received in two light-projecting optical fibers 21 and 23, so that the luminuous diode 18 can be utilized efficiently and the number of required elements can be thereby reduced.

Although in the above described embodiment, a non-reflecting portion 14b (detecting index) has been provided on the rotor 14 together with a pair of optical fibers 23 and 24 and a phototransistor 20 for providing two output waveforms, it is of course possible to provide a circular disc 16, a pair of optical fibers 21 and 22, a diode 18 and a phototransistor 19 and the like for providing a single output waveform.

We claim:

1. In a device for detecting a rotating speed of a thin shape motor of a type comprising a vertical shaft rotatably mounted on a base plate, a rotor of a planar shape secured to the vertical shaft in a spaced apart relation from the base plate, and a stator provided downwardly from the rotor on the base plate, the improvement comprising a rotatable disc of a diameter smaller than that of said rotor secured to said vertical rotatable shaft between said rotor and base plate, said rotatable disc having planar reflecting indices on a peripheral vertical surface thereof, a luminous element and a light-receiving element provided outwardly of said planar rotor, and a light-projecting optical fiber and a light-receiving optical fiber extending along said base plate such that one end of the light-projecting optical fiber is located to opposite said luminous element, while one end of the light-receiving optical fiber is located to opposite said light-receiving element, and that the other ends of said two optical fibers are placed in opposition to the peripheral surface of said rotatable disc.

2. A device as set forth in claim 1 wherein said light-projecting optical fiber and said light-receiving optical fiber are joined together at least at portions including two surfaces of the other ends thereof such that said two end surfaces are brought adjacent to each other joined together.

3. A device as set forth in claim 1 wherein said two optical fibers are joined together by use of a heat-forming process.

4. A device as set forth in claim 1 wherein a speed detecting index is further provided on the peripheral surface of said rotor, and the ends of further light-projecting and light-receiving optical fibers are brought to the proximity of said speed detecting index.

5. A device as set forth in claim 4 wherein either of said light-projecting optical fibers or said light-receiving optical fibers are joined together.

6. A device as set forth in claim 4, wherein said speed detecting index on said peripheral surface of said rotor is a single index indicating each cycle of rotation of said rotor.

* * * * *